United States Patent
Khoshnevisan et al.

(10) Patent No.: US 10,779,277 B2
(45) Date of Patent: Sep. 15, 2020

(54) GENERAL AUTHORIZED ACCESS (GAA) PRIMARY CHANNEL ASSIGNMENT FOR MULTIPLE OPERATORS

(71) Applicant: QUALCOMM Incorporated, San Diego, CA (US)

(72) Inventors: Mostafa Khoshnevisan, San Diego, CA (US); Farhad Meshkati, San Diego, CA (US); Satashu Goel, San Diego, CA (US); Damanjit Singh, San Diego, CA (US); Vinay Joseph, San Diego, CA (US); Mehmet Yavuz, San Diego, CA (US); Douglas Knisely, Seattle, WA (US)

(73) Assignee: QUALCOMM Incorporated, San Diego, CA (US)

( * ) Notice: Subject to any disclaimer, the term of this patent is extended or adjusted under 35 U.S.C. 154(b) by 126 days.

(21) Appl. No.: 15/643,114

(22) Filed: Jul. 6, 2017

(65) Prior Publication Data
US 2018/0014304 A1    Jan. 11, 2018

Related U.S. Application Data

(60) Provisional application No. 62/359,631, filed on Jul. 7, 2016, provisional application No. 62/397,246, filed on Sep. 20, 2016.

(51) Int. Cl.
*H04W 72/04*    (2009.01)
*H04W 24/08*    (2009.01)
*H04W 74/04*    (2009.01)

(52) U.S. Cl.
CPC ....... *H04W 72/0453* (2013.01); *H04W 24/08* (2013.01); *H04W 74/04* (2013.01)

(58) Field of Classification Search
CPC combination set(s) only.
See application file for complete search history.

(56) References Cited

U.S. PATENT DOCUMENTS 8,532,034 B2   9/2013   Shao et al.
8,908,605 B1 * 12/2014   Oroskar ............ H04W 28/0231
                                                  370/328

(Continued)

FOREIGN PATENT DOCUMENTS

| EP | 2083591 A1 | 7/2009 |
| EP | 2378702 A2 | 10/2011 |
| WO | WO-2016195751 A1 | 12/2016 |

OTHER PUBLICATIONS

International Search Report and Written Opinion issued in International Patent Application No. PCT/US2017/041045, dated Oct. 5, 2017 (13 pages).

*Primary Examiner* — Xavier S Wong
(74) *Attorney, Agent, or Firm* — Arent Fox, LLP

(57) ABSTRACT

Described herein are aspects related to assigning primary channels in wireless communications. An amount of available bandwidth within a radio frequency band can be determined for shared access by a plurality of operators, where each operator operates a radio access network having one of a plurality of radio communication compatibility types, and where each radio communication compatibility type defines a set of one or more compatible radio access technologies. The amount of available bandwidth can be allocated into radio compatibility type-specific bandwidth partitions for each radio communication compatibility type based on a number of the plurality of radio communication compatibility types and a number of the plurality of operators corresponding to each radio communication compatibility type. A primary channel can be assigned within at least one of the radio compatibility type-specific bandwidth (Continued)

partitions to at least one operator of the number of the plurality of operators.

30 Claims, 13 Drawing Sheets

(56) References Cited

U.S. PATENT DOCUMENTS

| | | | |
|---|---|---|---|
| 9,603,124 | B2 | 3/2017 | Ahmadi et al. |
| 9,622,085 | B2 | 4/2017 | Alsohaily et al. |
| 2011/0051711 | A1* | 3/2011 | Kishiyama ............ H04L 5/0007 370/350 |
| 2012/0076101 | A1* | 3/2012 | Kojima ................ H04L 5/0048 370/329 |
| 2012/0263083 | A1* | 10/2012 | Zhou .................. H04W 72/121 370/310 |
| 2012/0281637 | A1* | 11/2012 | Junell .................. H04W 16/14 370/329 |
| 2012/0314630 | A1* | 12/2012 | Walker ................. H04L 5/0039 370/281 |
| 2014/0080535 | A1 | 3/2014 | Gauvreau et al. |
| 2014/0177466 | A1* | 6/2014 | Inoue ................... H04B 7/0469 370/252 |
| 2014/0244808 | A1* | 8/2014 | Axelrod ............... H04L 41/042 709/220 |
| 2014/0293867 | A1* | 10/2014 | Horiuchi .............. H04W 16/14 370/315 |
| 2016/0119793 | A1 | 4/2016 | Tudose et al. |
| 2016/0316376 | A1* | 10/2016 | Wen ..................... H04W 16/14 |
| 2017/0245278 | A1* | 8/2017 | Xue ....................... H04L 27/26 |
| 2017/0374557 | A1* | 12/2017 | Mueck ................. H04W 16/14 |

* cited by examiner

1100

1102

Determining an amount of available bandwidth within a radio frequency band for shared access by a plurality of operators

1104

Allocating the amount of available bandwidth into radio compatibility type-specific bandwidth partitions for each radio communication compatibility type
based on:
- a number of the plurality of radio communication compatibility types, and
- a number of the plurality of operators corresponding to each radio communication compatibility type

1106

Assigning a primary channel bandwidth to each operator within each radio compatibility type-specific bandwidth partition

FIG. 11

GENERAL AUTHORIZED ACCESS (GAA) PRIMARY CHANNEL ASSIGNMENT FOR MULTIPLE OPERATORS

CLAIM OF PRIORITY UNDER 35 U.S.C. § 119

The present Application for Patent claims priority to Provisional Application No. 62/359,631, entitled "GENERAL AUTHORIZED ACCESS (GAA) PRIMARY CHANNEL ASSIGNMENT FOR MULTIPLE OPERATORS" filed Jul. 7, 2016, and Provisional Application No. 62/397,246, entitled "GENERAL AUTHORIZED ACCESS (GAA) PRIMARY CHANNEL ASSIGNMENT FOR MULTIPLE OPERATORS" filed Sep. 20, 2016, which are assigned to the assignee hereof and hereby expressly incorporated by reference herein for all purposes

BACKGROUND

Field

The present disclosure relates generally to communication systems, and more particularly, to methods and apparatus of primary channel assignment for multiple operators in a shared radio frequency band.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology.

Although newer multiple access systems, such as LTE, deliver faster data throughput than older technologies, such increased downlink rates have triggered a greater demand for higher-bandwidth content, such as high-resolution graphics and video, for use on or with mobile devices. As such, demand for bandwidth on wireless communications systems continues to increase, however, wireless spectrum is a limited and regulated resource. A proposed solution to these challenges involves a shared frequency range used for General Authorized Access (GAA) operation, such as in, but not limited to, the 3.5 GHz band (e.g., more specifically, the 3550-3700 MHz frequency range). Although the shared frequency range may be available to all operators, there may be more operators than available bandwidth to accommodate primary channel assignment for all of the operators. Therefore, new approaches are needed in wireless communications to more fully utilize the limited shared frequency resource and satisfy consumer demand.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect a method of wireless communication is provided. The method includes determining an amount of available bandwidth within a radio frequency band for shared access by a plurality of operators, where each operator operates a radio access network having one of a plurality of radio communication compatibility types, where each radio communication compatibility type defines a set of one or more compatible radio access technologies. The method also includes allocating the amount of available bandwidth into radio compatibility type-specific bandwidth partitions for each radio communication compatibility type based on a number of the plurality of radio communication compatibility types and a number of the plurality of operators corresponding to each radio communication compatibility type. The method further includes assigning a primary channel within at least one of the radio compatibility type-specific bandwidth partitions to at least one operator of the number of the plurality of operators.

In another aspect, an apparatus for wireless communications is provided. The apparatus includes a transceiver for communicating one or more wireless signals via one or more antennas, a memory configured to store instructions, and one or more processors communicatively coupled with the transceiver and the memory. The one or more processors are configured to determine an amount of available bandwidth within a radio frequency band for shared access by a plurality of operators, wherein each operator operates a radio access network having one of a plurality of radio communication compatibility types, wherein each radio communication compatibility type defines a set of one or more compatible radio access technologies, allocate the amount of available bandwidth into radio compatibility type-specific bandwidth partitions for each radio communication compatibility type based on a number of the plurality of radio communication compatibility types and a number of the plurality of operators corresponding to each radio communication compatibility type, and assign a primary channel within at least one of the radio compatibility type-specific bandwidth partitions to at least one operator of the number of the plurality of operators.

In another aspect, an apparatus of wireless communication is provided. The apparatus includes means for determining an amount of available bandwidth within a radio frequency band for shared access by a plurality of operators, wherein each operator operates a radio access network having one of a plurality of radio communication compatibility types, wherein each radio communication compatibility type defines a set of one or more compatible radio access technologies, means for allocating the amount of available bandwidth into radio compatibility type-specific bandwidth partitions for each radio communication compatibility type based on a number of the plurality of radio communication compatibility types and a number of the plurality of operators corresponding to each radio communication compatibility type, and means for assigning a primary channel within at least one of the radio compatibility type-specific bandwidth partitions to at least one operator of the number of the plurality of operators.

In yet another aspect, a computer-readable medium storing code executable by one or more processors for wireless communications is provided. The code includes code for determining an amount of available bandwidth within a radio frequency band for shared access by a plurality of operators, wherein each operator operates a radio access network having one of a plurality of radio communication compatibility types, wherein each radio communication compatibility type defines a set of one or more compatible radio access technologies, code for allocating the amount of available bandwidth into radio compatibility type-specific bandwidth partitions for each radio communication compatibility type based on a number of the plurality of radio communication compatibility types and a number of the plurality of operators corresponding to each radio communication compatibility type, and code for assigning a primary channel within at least one of the radio compatibility type-specific bandwidth partitions to at least one operator of the number of the plurality of operators.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 11 is a flowchart of an example of a method of wireless communication for assigning primary channel bandwidth for multiple operators in a shared radio frequency band.

DETAILED DESCRIPTION

Figure 1:
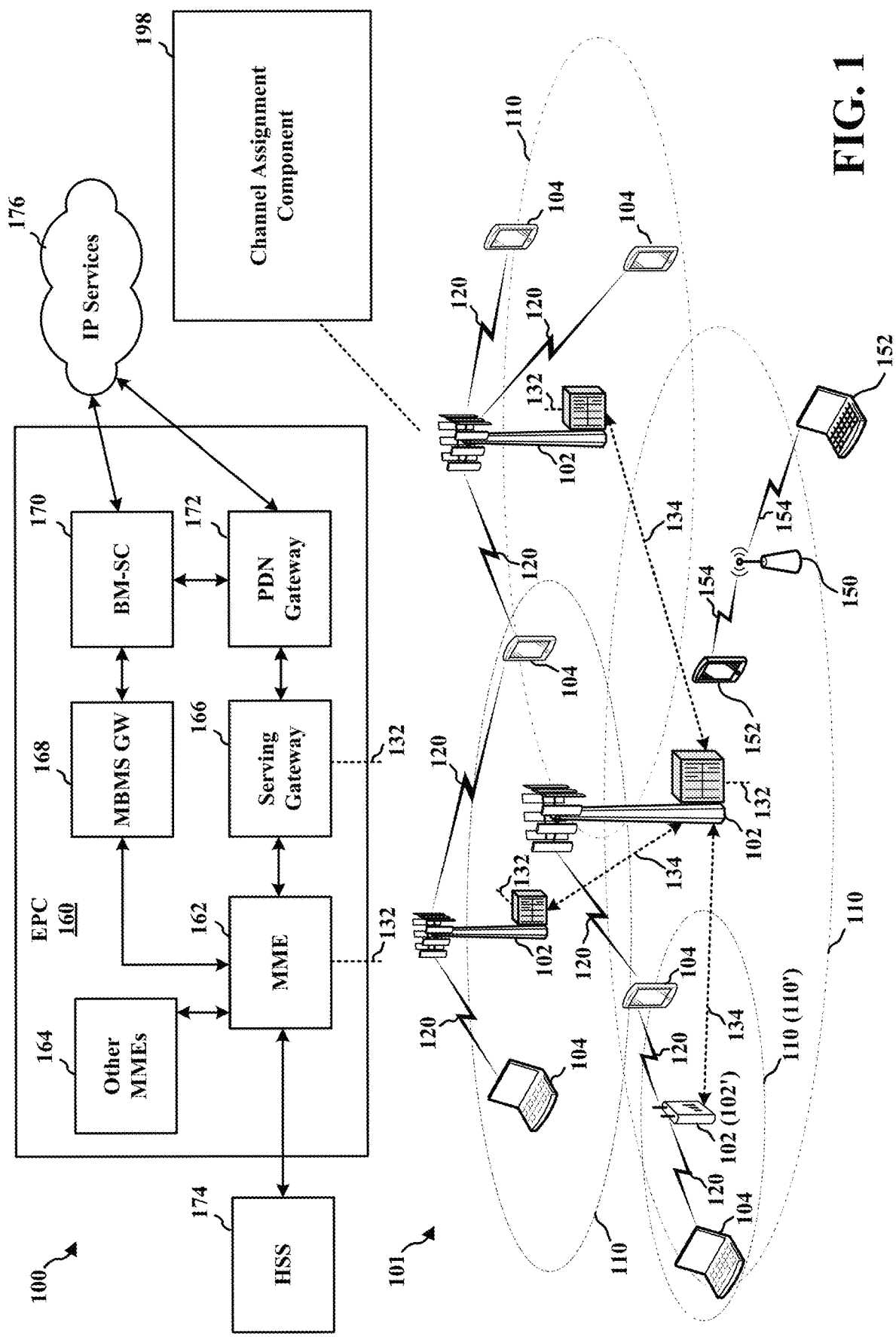
FIG. 1 is a diagram illustrating an example of a wireless communications system and an access network.

This disclosure generally relates to fair and efficient primary channel bandwidth assignment for multiple operators in a shared radio frequency band, such as but not limited to general authorized access (GAA) primary channel bandwidth assignment in the 3.5 GHz frequency band.

In one high-level aspect, the bandwidth allocation and primary channel bandwidth assignment described herein is based on a number of operators. For example, the present disclosure includes apparatus and methods that allocate an amount of available bandwidth, based on reserved bandwidth within the shared frequency band, and based on the number of operators requesting to use the shared frequency band (e.g., in a given geographic region). For instance, the apparatus and methods may determine the amount of available bandwidth by deducting one or more reserved frequency bands from the shared frequency band. For example, the one or more reserved frequency bands may correspond to, but are not limited to, bandwidth corresponding to incumbent licenses (e.g., relating to federal government users, such as radar systems, and/or fixed satellite service (FSS) users, and/or one or more corresponding guard bandwidths).

In another high-level aspect, the bandwidth allocation and primary channel bandwidth assignment described herein can be based on one or more factors, including, for example, how many (e.g., a count or a number) of different radio communication compatibility types of radio access networks are used by the operators, the respective number of the plurality of operators corresponding to each radio communication compatibility type, and/or the like. In this case, there may be a plurality of different radio communication compatibility types, where each radio communication compatibility type defines a set of one or more compatible radio access technologies. That is, the term "compatible" as used in this context includes communication compatibility such that operators of radio access networks associated with each radio communication compatibility type may be configured to operate together in a geographic region because the respective radio access technologies when used together may create a tolerable amount of interference (e.g., under an interference threshold), or can be used together without causing interference with each other's receiving or transmitting of signals. Communication compatibility within each radio communication compatibility type may be desired since users (e.g., UEs) that belong to a first operator may be open to all the nodes (which can also be referred to as Citizens Broadband Radio Service devices (CSBD)) from the first operator, and intra-operator interference may not be too strong. As such, in this aspect, the present disclosure includes apparatus and methods that allocate an amount of available bandwidth into radio compatibility type-specific bandwidth partitions for each radio communication compatibility type, where the amount of frequencies (e.g., a contiguous range, or two or more non-contiguous ranges, or a set of channels) within each radio compatibility type-specific bandwidth partition can be proportional to the respective number of operators operating radio access networks of the respective radio communication compatibility type.

In a further high-level aspect, the bandwidth allocation and primary channel bandwidth assignment described herein may further include maximizing the primary channel bandwidth for each radio compatibility type-specific bandwidth partition (e.g., maximizing a frequency range assigned to each primary channel) by taking into account coverage overlaps (e.g., interfering coverage areas), or lack thereof, existing between operators (e.g., between base stations of the operators). In one case, the present disclosure includes apparatus and methods that maximize the primary channel bandwidth for each radio compatibility type-specific bandwidth partition by reusing bandwidth, e.g., assigning a same frequency range, to different operators that do not have a coverage overlap. That is, the maximizing of the primary channel bandwidth in this case may be utilized when sufficient available bandwidth exists to allocate at least a minimum frequency range (e.g., a lower threshold amount of frequency range, which may be configurable, below which operations may become too inefficient, such as due to larger control overhead for smaller bandwidth) to each primary channel bandwidth assignment. In another case, the present disclosure includes apparatus and methods that maximize the primary channel bandwidth for each radio compatibility type-specific bandwidth partition by reusing bandwidth and, additionally, minimizing interference costs (e.g., an amount of interfering coverage areas). That is, the maximizing of the primary channel bandwidth in this case may be utilized when a large number of operators are operating in a given geographic area. In this situation, insufficient available bandwidth may exist to allocate at least the minimum frequency range to each primary channel bandwidth assignment, which may cause assigning the same bandwidth to at least two operators having overlapping coverage areas. Yet, in this case, the present apparatus and methods can allow for analyzing the overlapping coverage areas and prioritizing assigning a same frequency range to operators having non-overlapping (or minimally overlapping) coverage areas as compared to operators have relatively greater overlapping coverage areas. For example, in one use case, the present apparatus and methods may utilize graph theoretical approaches to efficiently take into account coverage overlaps, however, other types of analysis may also be used and are within the scope of this disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

It should be noted that the techniques described herein may be used for various wireless communication networks and/or technologies, such as but not limited to 5G or New Radio (NR), CDMA, TDMA, FDMA, OFDMA, SC-FDMA, and other systems. For example, a fifth generation (5G) wireless communications technology is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information. Also, the terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE, 5G/NR) communications over a shared radio frequency spectrum band. The description below, however, describes an LTE system for purposes of example, and LTE terminology is used in much of the description below, although the techniques are applicable beyond LTE applications (e.g., to 5G or NR networks or other next generation communication systems).

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a non-transitory computer-readable medium or a transitory computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communication system 100, including one or more access networks 101, having a channel assignment component 198 configured to assign primary channel bandwidth for multiple operators in a shared radio frequency band, which may include making fair and efficient primary channel bandwidth assignments for the multiple operators. The details of the operation and architecture associated with channel assignment component 198 are discussed in more detail below with respect to FIGS. 4-13. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include eNBs. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., where Y=5, 10, 15, or 20 MHz) bandwidth per carrier allocated in a carrier aggregation of up to a total of Yx MHz (x=number of component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) or Listen Before Talk (LBT) functionality prior to communicating in order to determine whether the channel is available (e.g., generally, to avoid transmitting on a channel where another transmission is occurring, which would cause interference).

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the Wi-Fi AP 150. The small cell 102', employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MulteFire (MF).

Base stations 102, UEs 104, APs 150, and STAs 152 may also operate in one or more shared frequency bands, such as according to General Authorized Access (GAA) in the 3.5 GHz band.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figures 2A, 2B:
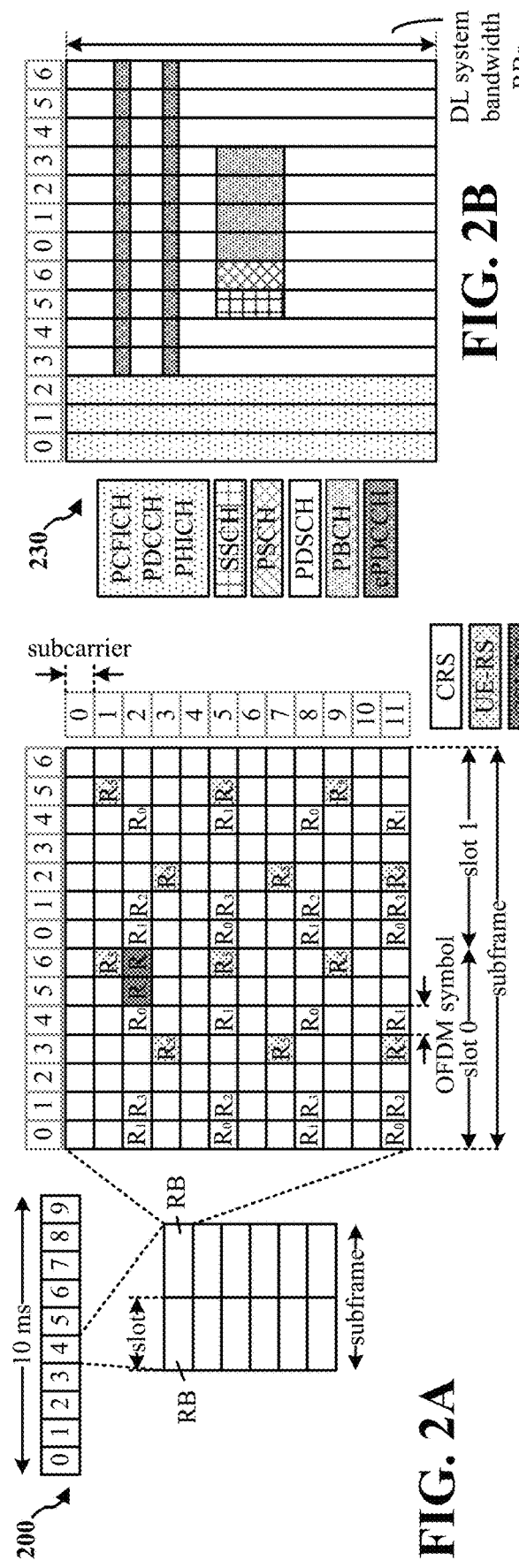
FIGS. 2A, 2B, 2C, and 2D are diagrams illustrating LTE examples of a downlink (DL) frame structure, DL channels within the DL frame structure, an uplink (UL) frame structure, and UL channels within the UL frame structure, respectively.
Figures 2C, 2D:
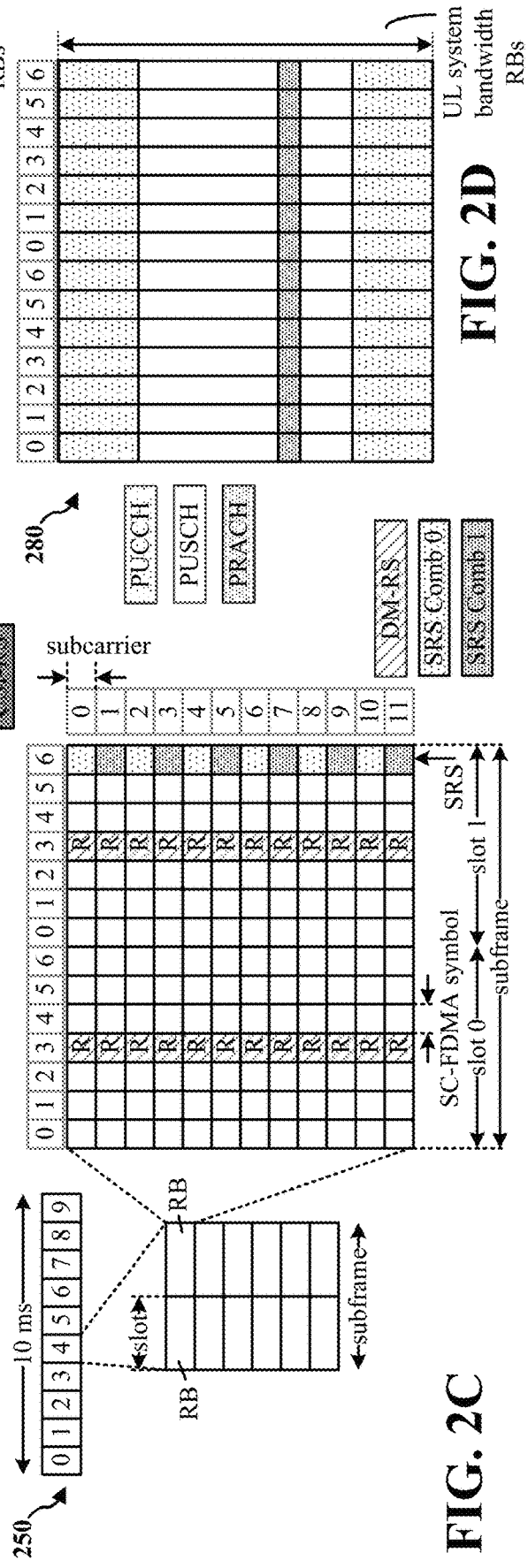

FIG. 2A is a diagram 200 illustrating an example of a DL frame structure in LTE, which may be utilized for communications between the wireless communication devices of FIG. 1, e.g., by one or more of base stations 102 or 102', UEs 104, APs 150, and/or STAs 152. FIG. 2B is a diagram 230 illustrating an example of channels within the DL frame structure in LTE, which may be utilized for communications between the wireless communication devices of FIG. 1. FIG. 2C is a diagram 250 illustrating an example of an UL frame structure in LTE, which may be utilized for communications between the wireless communication devices of FIG. 1. FIG. 2D is a diagram 280 illustrating an example of channels within the UL frame structure in LTE, which may be utilized for communications between the wireless communication devices of FIG. 1. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
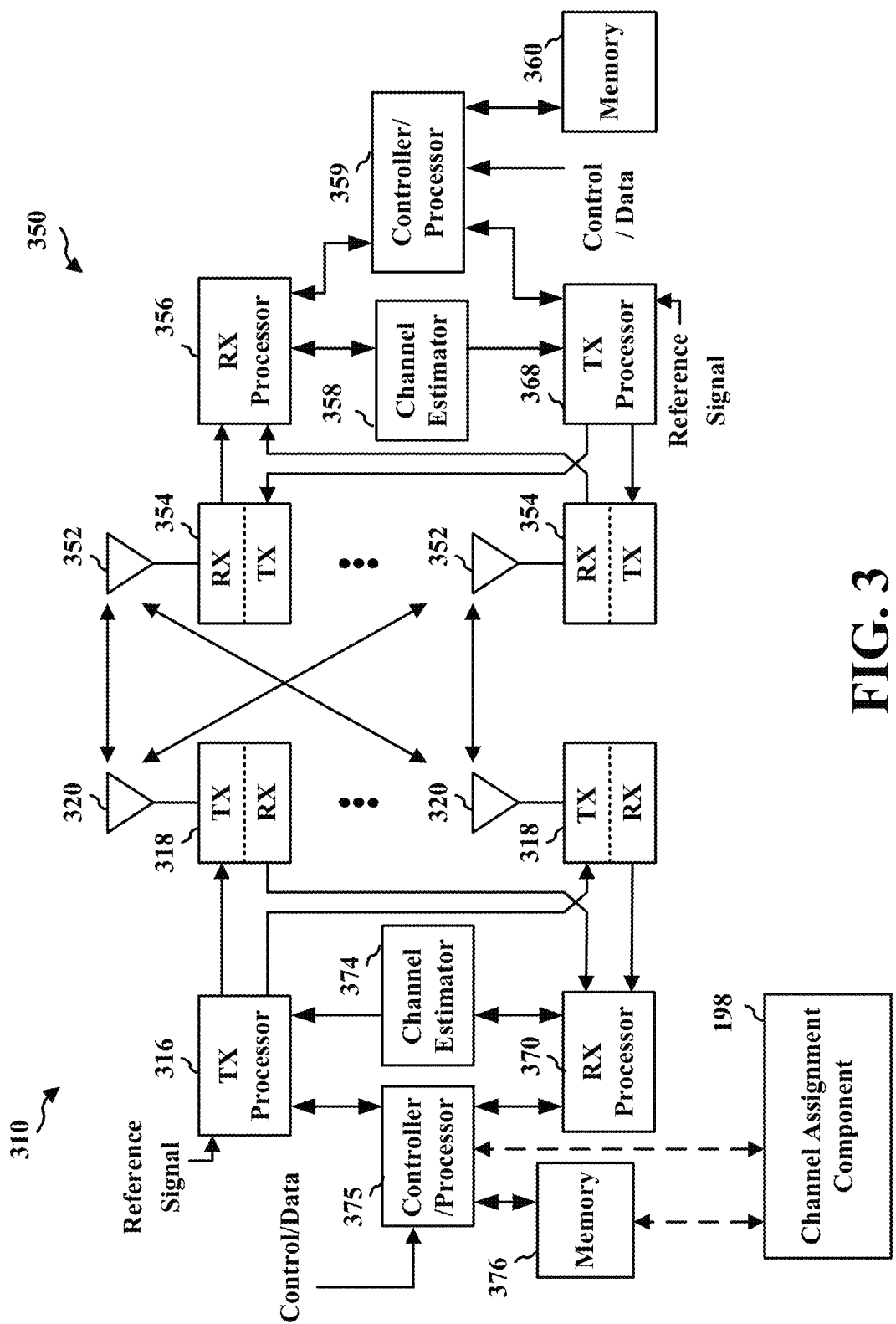
FIG. 3 is a diagram illustrating an example of an evolved Node B (eNB) and user equipment (UE) in an access network.

FIG. 3 is a block diagram of an eNB 310 in communication with a UE 350 in an access network, where eNB 310 may be an example of base stations 102 or 102' and/or APs 150 of FIG. 1, and where UE 350 may be an example of UEs 104 and/or STAs 152 of FIG. 1. In an aspect, channel assignment component 198 may be a part of eNB 310, such as implemented within controller/processor 375 and/or memory 376, or channel assignment component 198 may be implemented in one or more other network devices as described in more detail below. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demuliplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the eNB 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demuliplexing of MAC SDUs from TBs, scheduling information reporting, error correction through HARQ, priority handling, and logical channel prioritization.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
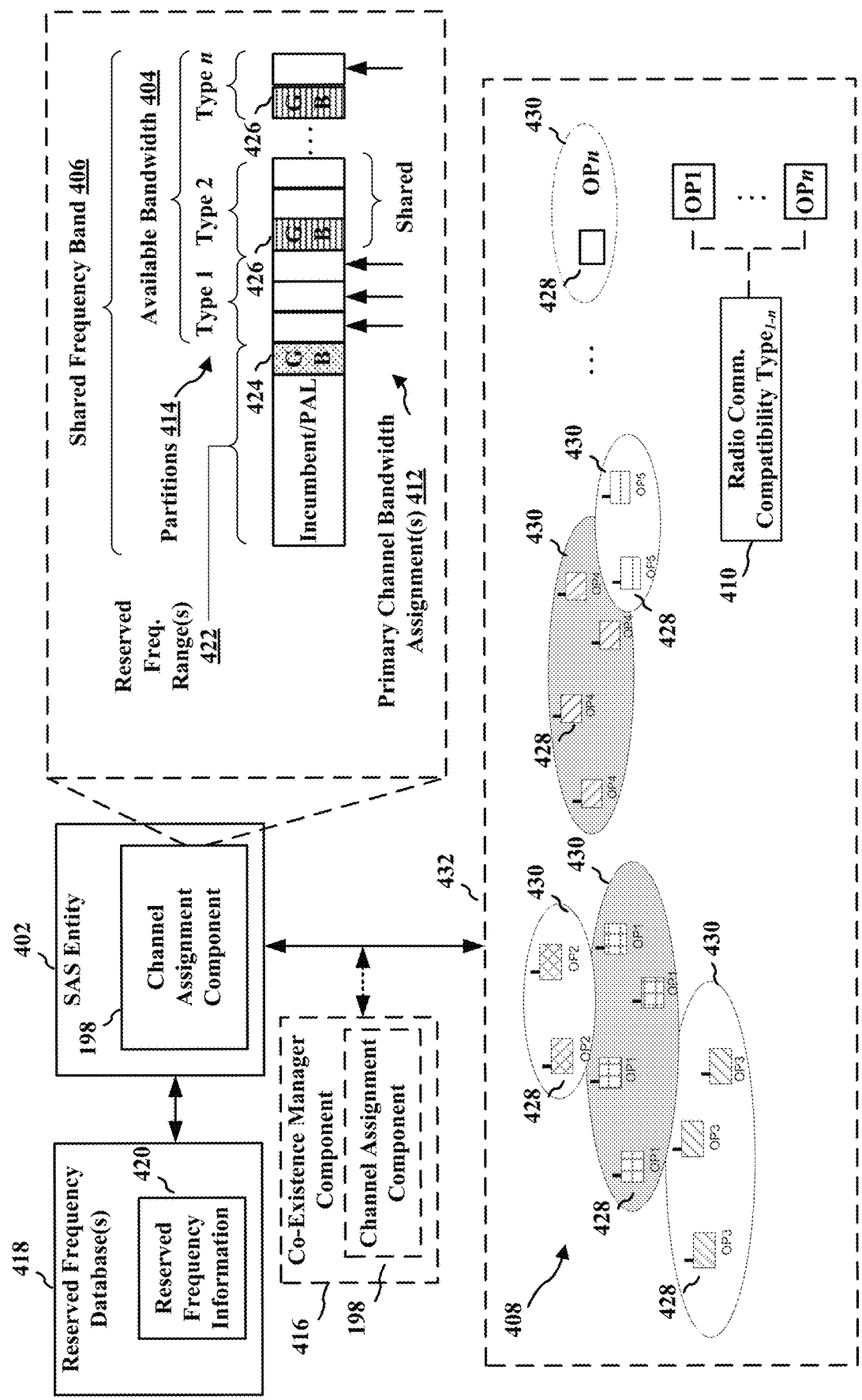
FIG. 4 is schematic diagram of an example of a network architecture according to one or more described aspects.

Referring to FIG. 4, a wireless communication system 400, which may be similar to wireless communication system 100 of FIG. 1, may include additional system components in one example implementation of assigning primary channel bandwidth for multiple operators in a shared radio frequency band using channel assignment component 198.

In particular, wireless communication system 400 includes a central entity, such as spectrum access system (SAS) entity 402, having channel assignment component 198 that is configured to perform bandwidth allocation from an amount of available bandwidth 404 in a shared frequency band 406 based on a number of operators 408 and/or a number of radio communication compatibility types 410 (e.g., types 1 to n, where n is a positive number; each operator 408 radio access network may be any one of type 1 to type n). In one example, shared frequency band 406 may include, but is not limited to, the 3.5 GHz band. Additionally, it should be noted that FIG. 4 illustrates one example of the amount of available bandwidth 404, e.g., contiguous bandwidth, which should not be construed as limiting. For instance, the amount of available bandwidth 404 may also be defined by two or more non-contiguous frequency ranges, and/or by a set of channels. Further, channel assignment component 198 can be configured to identify primary channel bandwidth assignments 412 to each operator. As used herein, a "primary channel" bandwidth refers to the allocated bandwidth discussed herein (e.g., based on number N of operators 408 and/or radio communication compatibility types 410), and is referred to as "primary" because an operator 408 or operator node (e.g., base station, access point, CBSD device, etc.) may expand their bandwidth (e.g., set of channels) usage beyond this allocated amount depending on interference conditions. As such, the concept of "primary channel" bandwidth as discussed herein is different from, and should not be confused with, the concept of a primary cell. In an aspect, channel assignment component 198 may allocate respective radio compatibility type-specific bandwidth partitions 414 for a respective number of operators 408. In an example, each radio compatibility type-specific bandwidth portion may have an amount of frequencies (e.g., a contiguous range, or two or more non-contiguous ranges, or a set of channels) that can be proportional to the respective number of operators 408 operating radio access networks of the respective radio communication compatibility type 410. In addition, a size of each of the amount of frequencies may be substantially equal for each respective operator.

In some aspects, wireless communication system 400 may optionally (as represented by dashed lines) include a central entity, such as a co-existence manager component 416, which also includes channel assignment component 198. As such, in some implementations, co-existence manager component 416 may act as a proxy for SAS entity 402 assigning primary channel bandwidths (e.g., making fair and efficient primary channel bandwidth assignments) for multiple operators in a shared radio frequency band. In other implementations, co-existence manager component 416 may assist or operate in conjunction with SAS entity 402 in assigning primary channel bandwidth for multiple operators in a shared radio frequency band.

Additionally, wireless communication system 400 includes one or more reserved frequency databases 418 that can respectively store reserved frequency information 420 that is used by channel assignment component 198 in determining the amount of available bandwidth 404. For example, reserved frequency information 420 may include information that identifies reserved frequency ranges 422 with which interference by operators should be avoided. For instance, reserved frequency information 420 and/or reserved frequency ranges 422 may include and/or relate to, but are not limited to, information identifying incumbent frequency ranges corresponding to federal users (e.g., radar systems) and/or fixed satellite system (FSS) users, and/or priority access license (PAL) frequency ranges corresponding to users that have paid for priority access to such frequencies, and/or one or more guard bands (GB) 424 corresponding to one or more of such reserved frequency ranges 422. In some implementations, the one or more reserved frequency databases 418 may be maintained and operated separately, such as by or in cooperation with a government agency (e.g., in the United States, the Federal Communication Commission). Further, in some implementations, reserved frequency information 420 based on newly added and/or expiring licenses, and/or based on use or lack of use of incumbent frequency ranges. For instance, regarding use or lack of use of incumbent frequency ranges, if a radar system is not operating in a certain geographic region, then the corresponding frequency range(s) may be made available for sharing.

In some aspects, in determining the amount of available bandwidth 404, channel assignment component 198 may additionally take into account, e.g., additionally deduct or subtract from shared frequency band 406, one or more inter-partition guard bandwidth frequency ranges 426. For example, an inter-partition guard bandwidth frequency range 426 may include a frequency range between two adjacent radio compatibility type-specific bandwidth partitions 414 that is used to avoid or reduce interference between transmissions in the respective adjacent radio compatibility type-specific bandwidth partitions 414. Moreover, in some aspects, channel assignment component 198 may deduct or subtract each inter-partition guard bandwidth frequency ranges 426 from shared frequency band 406 in an equal manner or in a biased manner. For example, channel assignment component 198 may equalize the deduction between adjacent radio compatibility type-specific bandwidth partitions 414 by having each respective partition bandwidth reduced an equal amount to account for the inter-partition guard bandwidth frequency range 426. Further, channel assignment component 198 may bias the deduction by having one of two adjacent radio compatibility type-specific bandwidth partitions 414 have its respective partition bandwidth reduced to account for the inter-partition guard bandwidth frequency range 426. For example, biasing may also include unequal bandwidth deductions from each adjacent radio compatibility type-specific bandwidth partitions 414.

Additionally, in an aspect of wireless communication system 400, each operator 408 may include and operate one or more nodes 428 (e.g., base stations, eNBs, APs, etc.) having a respective geographic coverage area 430 within a respective geographic region 432. As such, SAS entity 402 and/or co-existence manager 416 may operate channel assignment component 198 to make fair and efficient primary channel bandwidth assignments 412 within shared frequency band 406 for multiple operators 408 in geographic region 432.

Now, one example implementation will be described with respect to a 3.5 GHz deployment, where multiple Guaranteed Authorized Access (GAA) operators 408 share the shared frequency band 406 in a given geographical region 432. In this implementation, since each operator is closed to users from other operators, the primary channel (or protected channel) of two operators with overlapping coverage can be separate. Otherwise, strong interference may lead to an outage area for at least one of the operators. Each operator can be LTE-TDD or LTE-LBT (LBT=Listen Before Talk, e.g. LAA/eLAA/MF). In addition, there might be a use for guard band (GB) between channels of the LTE-TDD operators and channels of the LTE-LBT operators because of the additional interference due to the fact that the UL/DL subframes of the nodes are not synced between the operators (UE to UE and eNB to eNB interference). Also, if two LTE-TDD operators are not synced (not time sync or have different TDD configuration), then GB might be used for the same reason. In one example a single TDD configuration may be preferred, but more than one TDD configuration can be supported. Bandwidth expansion can happen outside the primary (protected) channel, such as within other licensed or shared access frequency ranges.

Figure 5:
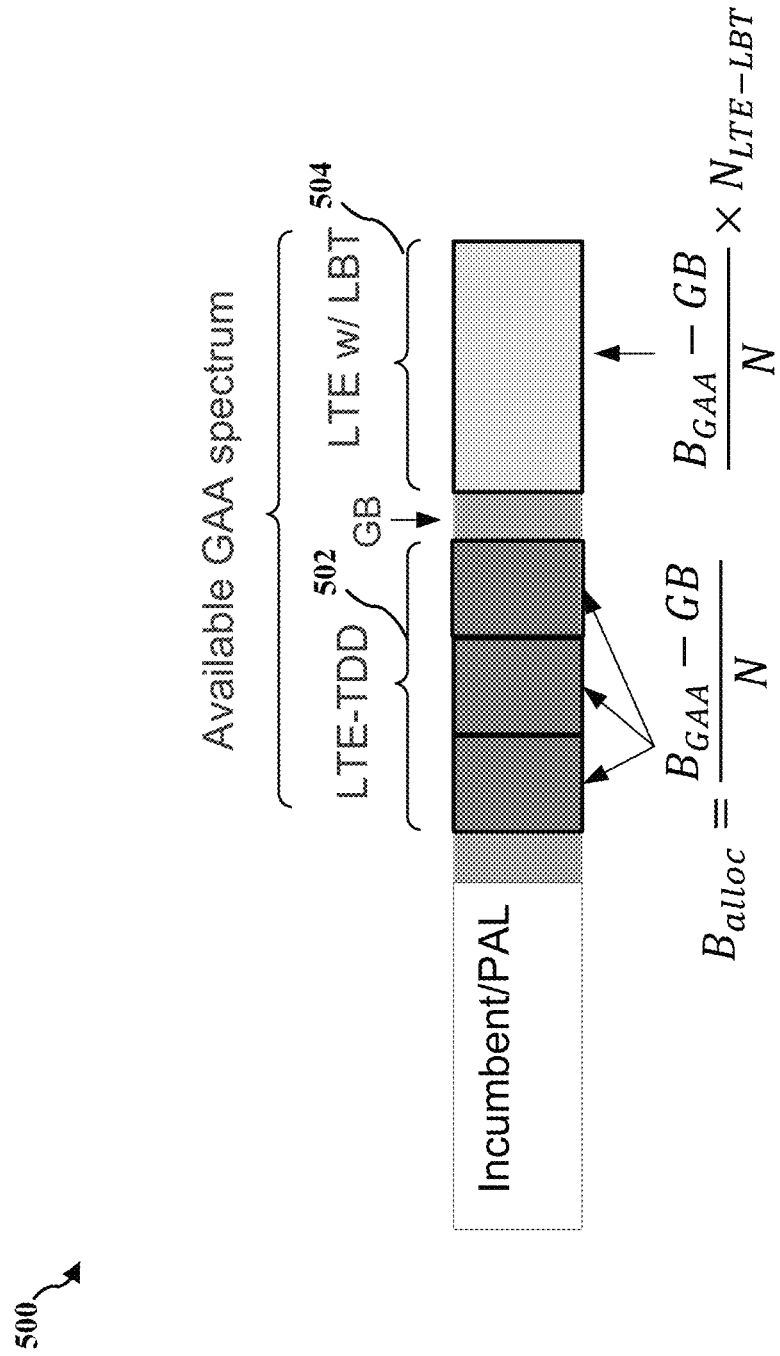
FIG. 5 is a graph of an example of a bandwidth allocation and primary channel bandwidth assignment according to one or more described aspects.

In one example, additionally referring to FIG. 5, a graph 500 of bandwidth allocation and channel assignment according to the present aspects enable GAA co-existence with a single TDD configuration. SAS entity 402 and/or Co-Existence Manager (CXM) component 416 can compute the total available bandwidth ($B_{GAA}$) for GAA in a given geographical area (e.g., census track) taking into account incumbent and PAL protection. SAS can divide the GAA spectrum to N partitions and assign $B_{alloc}$ to each of one or more operators where N is the total number of operators in the area. As described above, bandwidth 502 allocated for LTE-TDD radio communication compatibility type can be divided for a number of operators, CBSDs, radio technologies, etc. (e.g., 3 operators, CBSDs, or radio technologies, as shown in FIG. 5). LTE-LBT operators can share a given bandwidth 504, for example, since they can coexist because of LBT. In an aspect, each operator can expand its bandwidth beyond its own $B_{alloc}$ as long as it does not interfere with other operators on their allocated spectrum.

Figure 6:
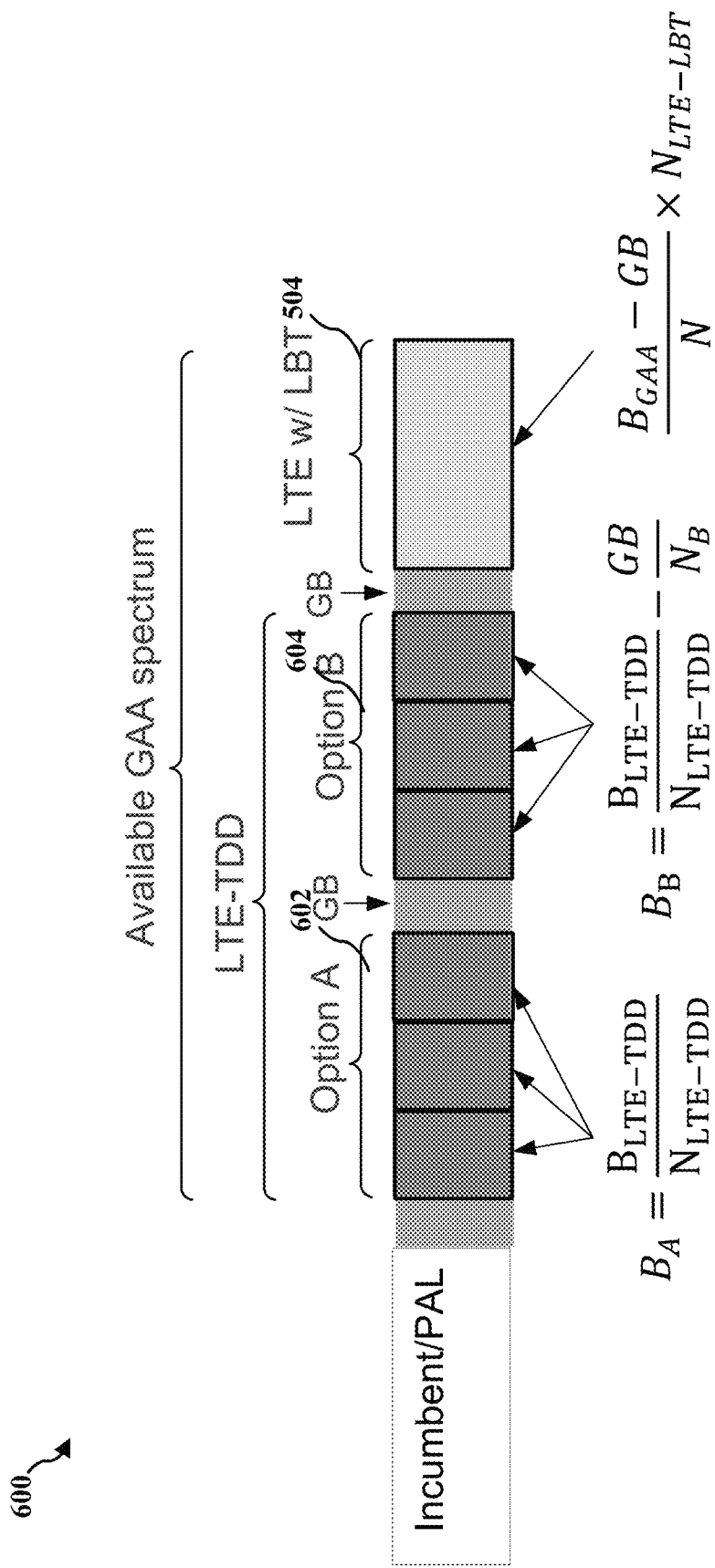
FIG. 6 is a graph of an example of a bandwidth allocation and primary channel bandwidth assignment with multiple options according to one or more described aspects.

Referring to FIG. 6, a graph 600 of bandwidth allocation and channel assignment expands on the example of FIG. 5 by allowing for two LTE-TDD configurations for which different bandwidths 602, 604 can be assigned. In particular, $N_{LTE-TDD}$ is the total number of LTE-TDD operators in the area. Out of $N_{LTE-TDD}$ operators, $N_A$ operators request for TDD configuration option A, and $N_B$ operators request for TDD configuration option B. Similar to before, bandwidth allocated to LTE-TDD is $B_{LTE-TDD}=(B_{GAA}-GB)*N_{LTE-TDD}/N$. In this case, there may be a guard band (GB) also between TDD configuration option A and TDD configuration option B. In one implementation, the cost of the GB can be on operators that do not choose option A (e.g., the bandwidth 604 for option B can be reduced to account for the GB). The cost per operator can reduce if more operators request for option B. In the special case of $N_A=0$ and $N_B=N_{LTE-TDD}$ (all operators request for option B), GB can be 0.

Additionally, the present aspects may include one or more efficient solutions based on coverage overlaps between operators.

Figure 7:
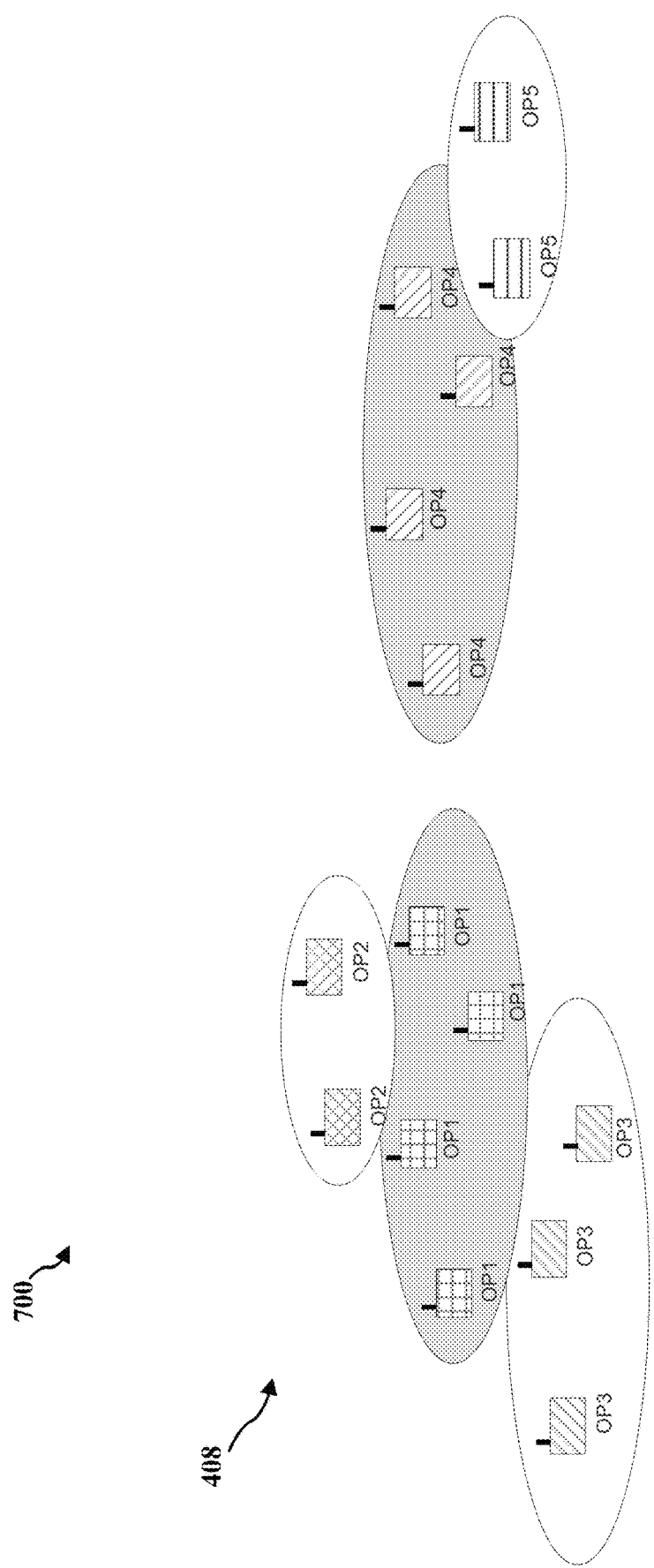
FIG. 7 is a diagram of an example of a bandwidth allocation and channel assignment based on coverage overlap between operators according to one or more described aspects.

Referring to FIG. 7, a diagram 700 illustrates an aspect of bandwidth allocation and channel assignment based on coverage overlap between operators 408. For example, where the total GAA spectrum is divided equally between operators in a given geographical area (e.g., census track) for primary channel, then the primary channel bandwidth can be small if the number of operators becomes large. In the example of FIG. 7, however, operators {1,2,3} and {4,5} are completely non-overlapping from an interference perspective. In this example, instead of considering N=5 for assigning the bandwidth allocations (e.g., using the formulas above), the present aspects can utilize two independent spectrum allocations, e.g., one with $N_1=3$ and the other with $N_2=2$ for each set of operators that are non-overlapping (or minimally overlapping such that interference caused between operators is lower than a threshold). As such, a larger primary channel bandwidth can be allocated. Other co-existence concepts (TDD vs LBT, TDD options A and B, BW expansion, etc.) can also be applied independently for each of the operator sets {1,2,3} and {4,5}.

Figure 8:
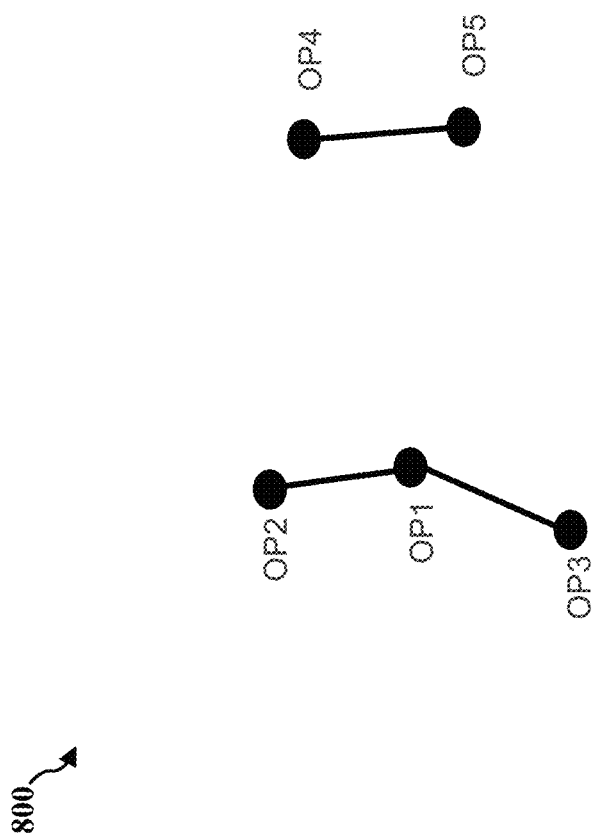
FIG. 8 is a graph of an example of a bandwidth allocation and channel assignment based on a graph theoretical approach according to one or more described aspects.

Referring to FIG. 8, a graph 800 illustrates an aspect of bandwidth allocation and channel assignment based on a graph theoretical approach. Graph theory terminologies may include the following:

a graph G(V, E) is a set V of vertices and a set E of edges;
a graph is connected if there is a path between every pair of distinct vertices of the graph;
a subgraph of a graph G is another graph formed from a subset of the vertices and edges of G;
a connected component of a graph is a maximal connected subgraph;
a connected graph has only one connected component; and
an isolated vertex of a graph is a vertex whose degree is zero.

According, the present aspects may include a solution that includes creating a graph 800 in a given geographical area (e.g., census track) with N operators, where:

vertices of the graph correspond to operators;
there is an edge between vertex i to vertex j (i,j ∈ {1, 2, . . . , N}, i≠j) if there is a coverage overlap between any node belong to operator i and any node belong to operator j;
definition of coverage overlap can be distance based or RF based (NL and UE reports);
asynchronous TDD may apply as well (UE-UE and eNB-eNB interference); and
no need for an edge between LBT operators (LBT nodes can co-exist via over-the-air (OTA) contention).

In this scenario, assuming that the graph 800 has K connected components with a number of vertices $N_1$, $N_2$, . . . , $N_K$ where $\Sigma_{k=1}^{K} N_k = N$, based on the foregoing, the present aspects may perform spectrum allocation independently for each connected component. In this case, the primary channel bandwidths can be larger if the original graph is not connected.

Other coexistence concepts described above can be done independently for each connected component. For example, TDD or LBT BW allocation can be per connected component for the whole GAA spectrum: $N_{LTE-TDD}$ and $N_{LTE-LBT}$ per connected component. Also, for example, TDD configuration options A and B can be per connected component for the whole GAA spectrum: $N_A$ and $N_B$ per connected component. Additionally, for example, for BW expansion SAS entity 404 and/or CXM component 416 may consider the interaction and coexistence information between nodes that belong to an operator set of a connected component.

Thus, this can lead to reduced complexity and enhanced efficiency for GAA coexistence.

For the above-discussed example, the corresponding graph in FIG. 8 includes two connected components {1,2,3} and {4,5}, i.e., K=2. As such, independent GAA coexistence can be considered for the whole GAA spectrum for each of the connected components with $N_1$=3 and $N_2$=2.

Figure 9:
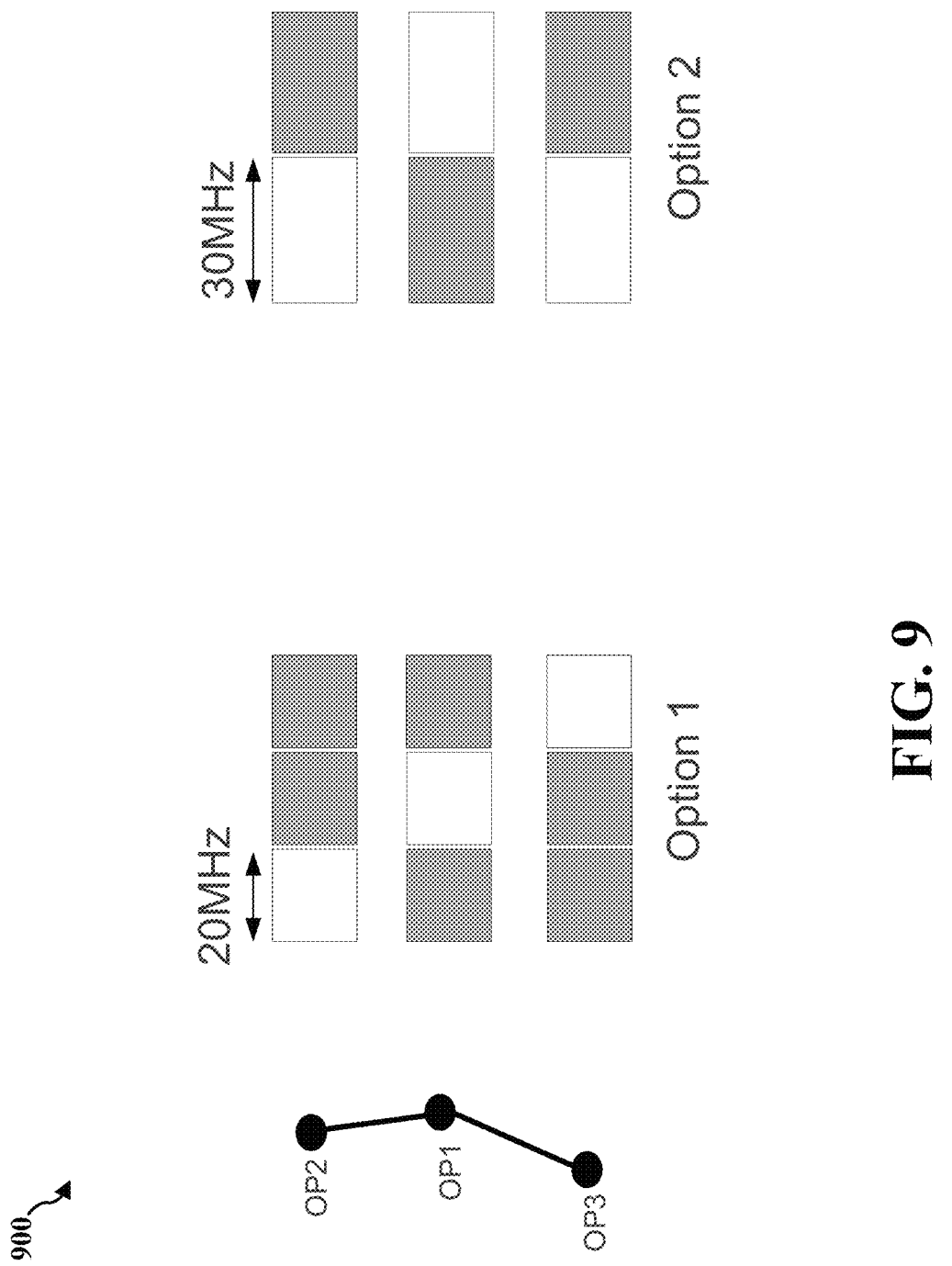
FIG. 9 is a graph of another example of a bandwidth allocation and channel assignment based on a graph theoretical approach according to one or more described aspects.

Referring to FIG. 9, a graph 900 illustrates another aspect of bandwidth allocation and channel assignment based on a graph theoretical approach, where another generalization may be illustrated by another example. Assume that there are 3 LTE-TDD operators with graph, and SAS entity 404 and/or CXM component 416 allocates a maximum amount of primary channel bandwidth to these operators with of a 60 MHz BW such that no two operators with overlapping coverage have an overlapping primary channel (e.g., a co-existence condition), and each operator gets the same BW for the primary channel (e.g., a fairness condition).

In the first BW allocation, Option 1, each operator gets 20 MHz, while in the second BW allocation, Option 2, each operator gets 30 MHz. Both the co-existence and fairness conditions above can be satisfied in both options. In other words, Option 2 is similar to a coloring of the graph with a minimum number of colors.

Additionally, in some implementations, the present aspects may include or be based on more additional graph theory terminologies. For example, a proper coloring is an assignment of colors to the vertices of a graph so that no two adjacent vertices have the same color. Also, a k-coloring of a graph is a proper coloring involving a total of k colors. Further, a graph that has a k-coloring is said to be k-colorable. Notably, the chromatic number of a graph is the minimum number of colors in a proper coloring of that graph. This may be a non-polynomial (NP) problem. In particular, this is a well-studied subject in the graph theory with many algorithms in polynomial time that leads to the chromatic number and the associated coloring in most cases. As such, the chromatic number may be smaller or equal to the number of vertices in a graph; and, if d is the largest of the degrees of the vertices in a graph G, then the chromatic number of G can be at most d+1.

Figure 10:
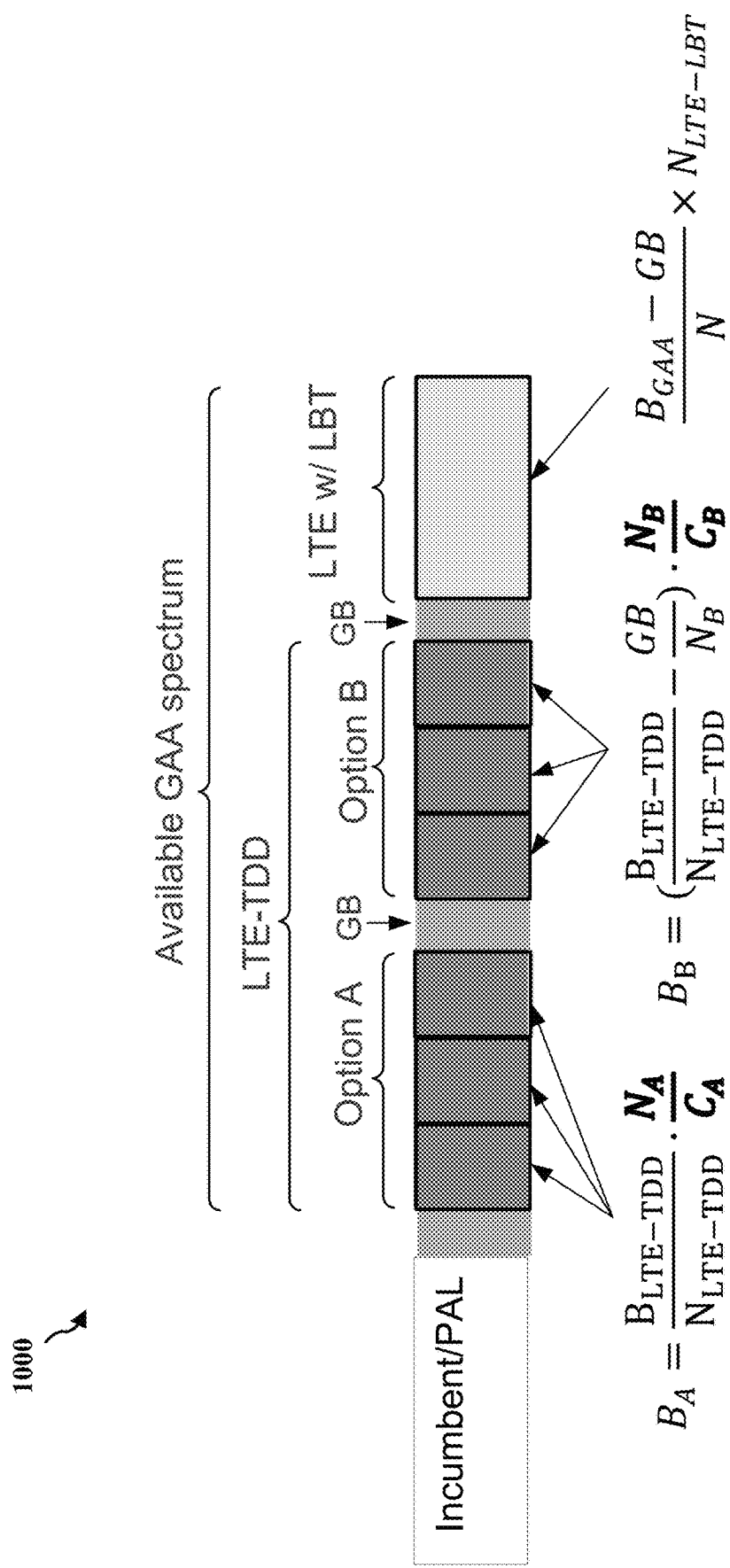
FIG. 10 is a graph of an example of a primary channel bandwidth allocation based on another aspect of graph theory described herein.

Referring to FIG. 10, an example graph 1000 includes primary channel bandwidth allocation based on the above-discussed graph theoretical concepts. In particular, the methodology operates as follows: given the graph associated with a given geographical area (e.g., census track), for each connected component of the graph, determine the total BW for LTE-LBT, LTE-TDD option A, and LTE-TDD option B based on $N_{LTE-LBT}$, $N_A$, $N_B$. Further, for each of the LTE-TDD options A and B in the connected component find the chromatic number and associated coloring separately. Additionally, let $C_A$ denote the chromatic number corresponds to the subgraph with LTE-TDD operators with TDD configuration option A and the corresponding edges in the connected component. Then, split the total LTE-TDD option A BW into $C_A$ chunks ($C_A \leq N_A$). In this case, the primary channel bandwidth can be larger than the simple solution described above if $C_A < N_A$. Also, this is the same for LTE-TDD option B, e.g., ($C_B \leq N_B$).

In other aspects, the present apparatus and methods may incorporate additional extensions of the above-described solutions. For instance, the present apparatus and methods can perform efficiently when faced with a large number of operators in a given geographical area. For example, assume that the smallest granularity for primary channel is 5 MHz. With simplified solution, the procedure may not be feasible if BW/5 MHz<N (N number of operators), as the primary channel bandwidth can be smaller than 5 MHz. With the presently described functionality, however, the present apparatus and methods can improve the condition such that BW/5 MHz<C (where C is the chromatic number of a connected component of the graph). Even in the case of (BW/5 MHz<C), the present solution can still color the graph with BW/5 MHz colors (e.g., largest number of separate primary channels each 5 MHz) such that the interference cost in the weighted graph is minimized. For instance, this can be achieved by making the weights between two vertices equal to a value of 1 if there is an edge between them, and otherwise making them equal to a value of 0. In other words, this may be equivalent to minimizing the number of edges between the vertices with the same color. That is, the present aspects separate operators that have the relatively largest amount of overlap, while allowing one or more operators having a relatively minimum amount of overlap have the same color.

In a further aspect, the present apparatus and methods may be utilized for time asynchronous networks. Using graphs explained above, if an LTE-TDD operator does not have the common TDD timing offset (asynchronous ("async") operator), then it can be allowed to operate in the LTE-TDD GAA spectrum if it is an isolated vertex of the graph. Otherwise, e.g., when it is not an isolated vertex of the graph, add another category option C (similar to TDD configuration option A and B) with a GB, but the cost of the GB can be on this operator (e.g., the GB range can be deducted from the primary channel bandwidth assigned to this operator). As such, in this case, $$B_C = \frac{B_{LTE\text{-}TDD}}{N_{LTE\text{-}TDD}} - GB$$

is the primary channel BW for this operator.

Other operators may be allowed to expand into this part of spectrum if they do not create TDD-aligned interference (e.g., no need for avoiding TDD-misaligned interference in this case). They can also expand into the GB part under the same condition.

Additionally, this operator (e.g., not an isolated vertex of the graph) may be allowed to expand in other parts of spectrum if it also does not create any TDD-misaligned interference to the primary channel of another operator (in addition to TDD-aligned interference). Also, from the point of view of other operators, there is no penalty (whether this operator is in time sync or not does not matter to other operators). A similar BW allocation may be utilized if there are multiple time asynchronous operators in a connected component of the graph. In this case, for example, all the BW allocation may be on a per connected component basis.

Referring to FIG. 11, an example aspect of a method 1100 of wireless communication includes assigning primary channel bandwidth for multiple operators in a shared radio frequency band. For example, method 1100 relates to the above-discussed implementations, and may be performed by a central entity, such as SAS entity 404 and/or co-existence manager component 416 executing channel assignment component 198.

At block 1102, method 1100 includes determining an amount of available bandwidth within a radio frequency band for shared access by a plurality of operators, where each operator operates a radio access network having one of a plurality of radio communication compatibility types, where each radio communication compatibility type defines a set of one or more non-interfering radio access technologies.

At block 1104, method 1100 includes allocating the amount of available bandwidth into radio compatibility type-specific bandwidth partitions for each radio communication compatibility type based on a number of the plurality of radio communication compatibility types and a number of the plurality of operators corresponding to each radio communication compatibility type;

At block 1106, method 1100 includes assigning a primary channel bandwidth to each operator within each radio compatibility type-specific bandwidth partition.

In an aspect, where method 1100 takes into account incumbent/PAL, determining the amount of available bandwidth can also include subtracting one or more reserved frequency ranges from the radio frequency band, where the one or more reserved frequency ranges corresponds to bandwidth reserved for incumbent licenses and priority access licenses.

In an aspect, where method 1100 takes into account guard bandwidth, determining the amount of available bandwidth can include subtracting one or more guard bandwidth frequency ranges from the radio frequency band, where the one or more guard bandwidth frequency ranges corresponds to guard bandwidth between the available bandwidth and one or more reserved frequency ranges, or to guard bandwidth between the radio compatibility type-specific bandwidth partitions, or both.

In an aspect where method 1100 provides compatibility allocations proportioned by a number of operators, allocating the amount of available bandwidth into radio compatibility type-specific bandwidth partitions can include proportioning an amount of frequencies (e.g., a contiguous range, or two or more non-contiguous ranges, or a set of channels) within each radio compatibility type-specific bandwidth partition according to the number of the plurality of operators corresponding to each radio communication compatibility type.

In an alternative aspect, which may operate independently from or in combination with any of the described aspects, method 1100 may include proportioning a frequency range of each radio compatibility type-specific bandwidth partition according to the number of CBSD devices that belong to each radio communication compatibility type.

In an aspect where method 1100 assigns primary channel bandwidth within a partition based on a number of operators, determining the amount of available bandwidth can include subtracting one or more guard bandwidth frequency ranges from the radio frequency band. Additionally, in this case, assigning the primary channel bandwidth to each operator within each radio compatibility type-specific bandwidth partition can include dividing at least one of the radio compatibility type-specific bandwidth partitions by the number of the plurality of operators corresponding to the respective radio communication compatibility type to define one or more operator-specific bandwidths, and the assigning includes assigning each primary channel bandwidth to one of the one or more operator-specific bandwidths.

In an aspect where method 1100 assigns primary channel bandwidth within a partition based on a number of operators, e.g., a single LTE-TDD combined with a single LTE-LBT case, determining the amount of available bandwidth can include subtracting one or more guard bandwidth frequency ranges from the radio frequency band, where the one or more guard bandwidth frequency ranges corresponds to guard bandwidth between the available bandwidth and one or more reserved frequency ranges and one or more guard bandwidths between each radio compatibility type-specific bandwidth partition. Further, in this case, assigning the primary channel bandwidth to each operator within each radio compatibility type-specific bandwidth partition can include identifying at least one non-contention-based access type within the plurality of radio communication compatibility types. Additionally, for the at least one non-contention-based access type, the method 1100 may further include dividing the corresponding one of the radio compatibility type-specific bandwidth partitions by the number of the plurality of operators corresponding to the respective radio communication compatibility type to define one or more operator-specific bandwidths. Also, for the at least one non-contention-based access type, the method 1100 may further include assigning each primary channel bandwidth for each operator of the at least one non-contention-based access type to one of the one or more operator-specific bandwidths.

In an aspect where method 1100 assigns primary channel bandwidth within a partition, reduced by GB penalty, based on a number of operators, e.g., a multi-LTE-TDD case and/or asynchronous (with non-isolated vertex) case, determining the amount of available bandwidth may include subtracting one or more inter-partition guard bandwidth frequency ranges from one or more of the radio compatibility type-specific bandwidth partitions. Additionally, assigning the primary channel bandwidth to each operator within each radio compatibility type-specific bandwidth partition may include dividing the one or more of the radio compatibility type-specific bandwidth partitions from which the one or more inter-partition guard bandwidth frequency ranges were subtracted by the number of the plurality of operators corresponding to the respective radio communication compatibility type to define one or more operator-specific bandwidths. Moreover, the assigning includes assigning each primary channel bandwidth for each operator from the one or more of the radio compatibility type-specific bandwidth partitions from which the one or more inter-partition guard bandwidth frequency ranges were subtracted to one of the one or more operator-specific bandwidths.

In an aspect where method 1100 assigns primary channel bandwidth within a partition and maximizes primary channel bandwidth, e.g., with no coverage overlap, the assigning includes maximizing each primary channel bandwidth within each radio compatibility type-specific bandwidth partition by assigning a same frequency range to two or more operators having non-interfering coverage areas. In another alternative, the assigning includes maximizing each primary channel bandwidth within two or more sets of operators having non-interfering coverage areas by independently performing the assigning for each of the two or more sets of operators having non-interfering coverage areas.

In an alternative aspect, which may operate independently from or in combination with any of the described aspects, method 1100 may assign primary channel bandwidth within a partition and maximize primary channel bandwidth, e.g., with no coverage overlap, where the assigning includes maximizing each primary channel bandwidth within each radio compatibility type-specific bandwidth partition by assigning a same frequency range to two or more CBSD devices having non-interfering coverage areas.

In a further alternative aspect, which may operate independently from or in combination with any of the described aspects, method 1100 may assign primary channel bandwidth within a partition and maximize primary channel bandwidth, e.g., with no coverage overlap, where the assigning includes maximizing each primary channel bandwidth within each radio compatibility type-specific bandwidth partition by assigning a same frequency range to two or more technologies (e.g., radio access technologies) having non-interfering coverage areas.

In an aspect where method 1100 assigns primary channel bandwidth within a partition and maximizes primary channel bandwidth, e.g., with coverage overlap, the assigning includes maximizing each primary channel bandwidth within each radio compatibility type-specific bandwidth partition by assigning a same frequency range to two or more operators having a least amount of interfering coverage areas.

Figure 12:
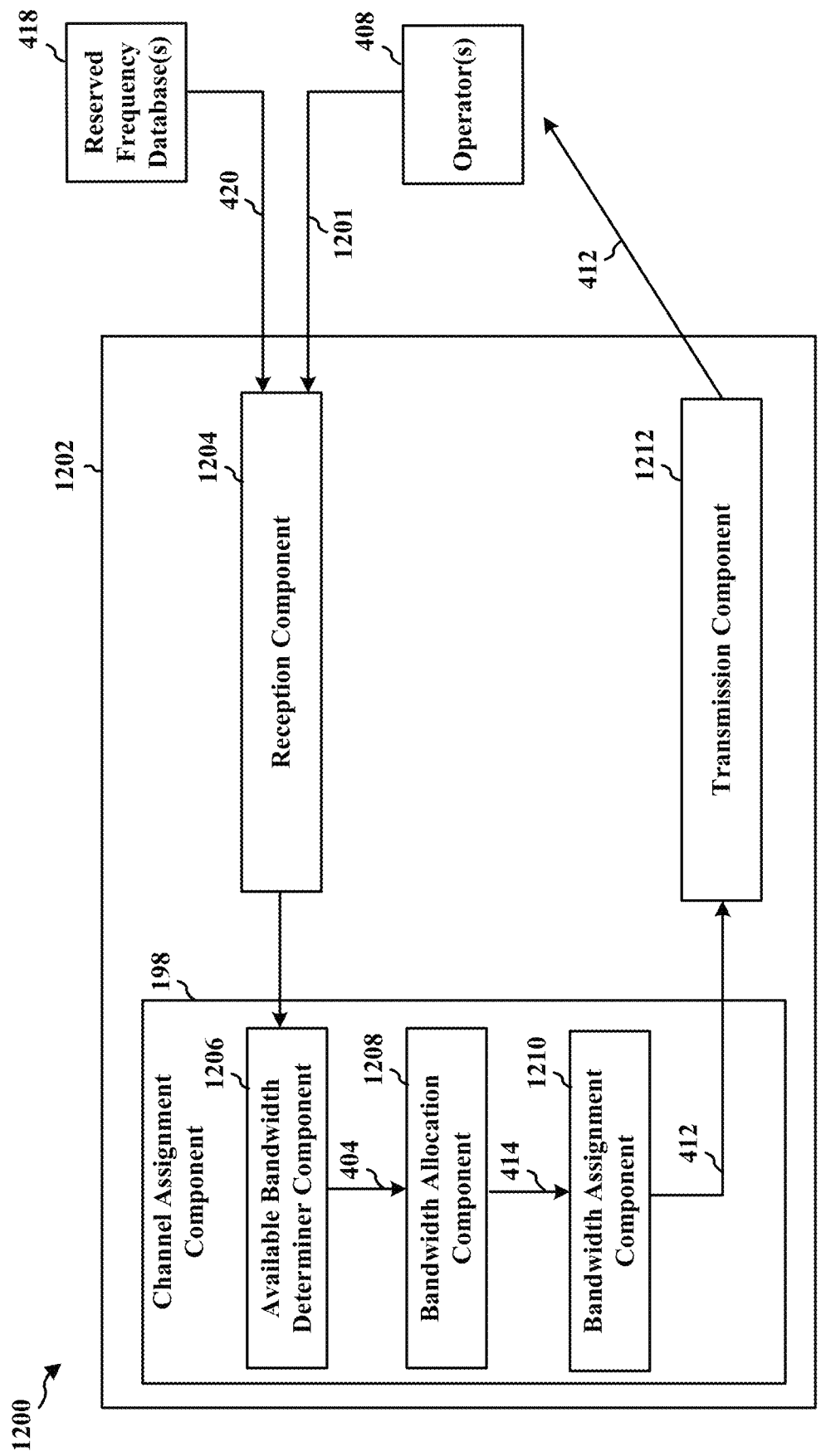
FIG. 12 is a conceptual data flow diagram illustrating an example of a data flow between components in an example of an apparatus according to one or more described aspects.

FIG. 12 is a conceptual data flow diagram 1200 illustrating the data flow between different means/components in an exemplary apparatus 1202, such as SAS entity 402 and/or co-existence manager component 416, each of which may also be implemented by base station 102 and/or AP 150. The apparatus 1202 includes a reception component 1204 (e.g., transceiver, receiver, etc.) that receives a primary channel bandwidth allocation request 1201 from one or more operators 408, and reserved frequency information 420 from one or more reserved frequency databases 418. Primary channel bandwidth allocation request 1201 may include radio access network configuration information (e.g., network technology type, protocol and/or protocol options used, etc.) and geographic location-related information (e.g., geographic coordinates of nodes and/or coverage area, UE reports of signal strengths associated with UE locations, etc.) and/or any other information usable by channel assignment component 198 in order to determine a radio communication compatibility type, and/or a coverage area corresponding to the respective operator 408 and/or a coverage overlap with other operators. Further, apparatus 1202 includes channel assignment component 198 having an available bandwidth determiner component 1206 that determines the amount of available bandwidth 404 in shared frequency band 406 for a given geographic region 432. Further, channel assignment component 198 includes a bandwidth allocation component 1208 that determines one or more radio compatibility type-specific bandwidth partitions 414 for each radio communication compatibility type based on a number of the plurality of radio communication compatibility types and a number of the plurality of operators corresponding to each radio communication compatibility type. Additionally, channel assignment component 198 includes a bandwidth assignment component 1210 that assigns a primary channel bandwidth assignment 412 to each operator 408 within each radio compatibility type-specific bandwidth partition 414. Also, apparatus 1202 includes a transmission component 1212 (e.g., transceiver, transmitter, etc.) that communicates the primary channel bandwidth assignment 412 within each radio compatibility type-specific bandwidth partition 414 to each operator 408. Thus, based on the operation of apparatus 1202, each operator 408 may configure its respective nodes (e.g., base stations, access points) for communication with one or more UEs.

The apparatus may include additional components that perform each of the actions described with respect to the aforementioned flowchart of FIG. 11 and/or the aspects of FIGS. 4-10. As such, each action described with reference to the aforementioned flowchart of FIG. 11 and/or the aspects of FIGS. 4-10 may be performed by a component and the apparatus may include one or more of those components. The components may be one or more hardware components specifically configured to carry out the stated processes/ algorithm, implemented by a processor configured to perform the stated processes/algorithm, stored within a computer-readable medium for implementation by a processor, or some combination thereof.

Figure 13:
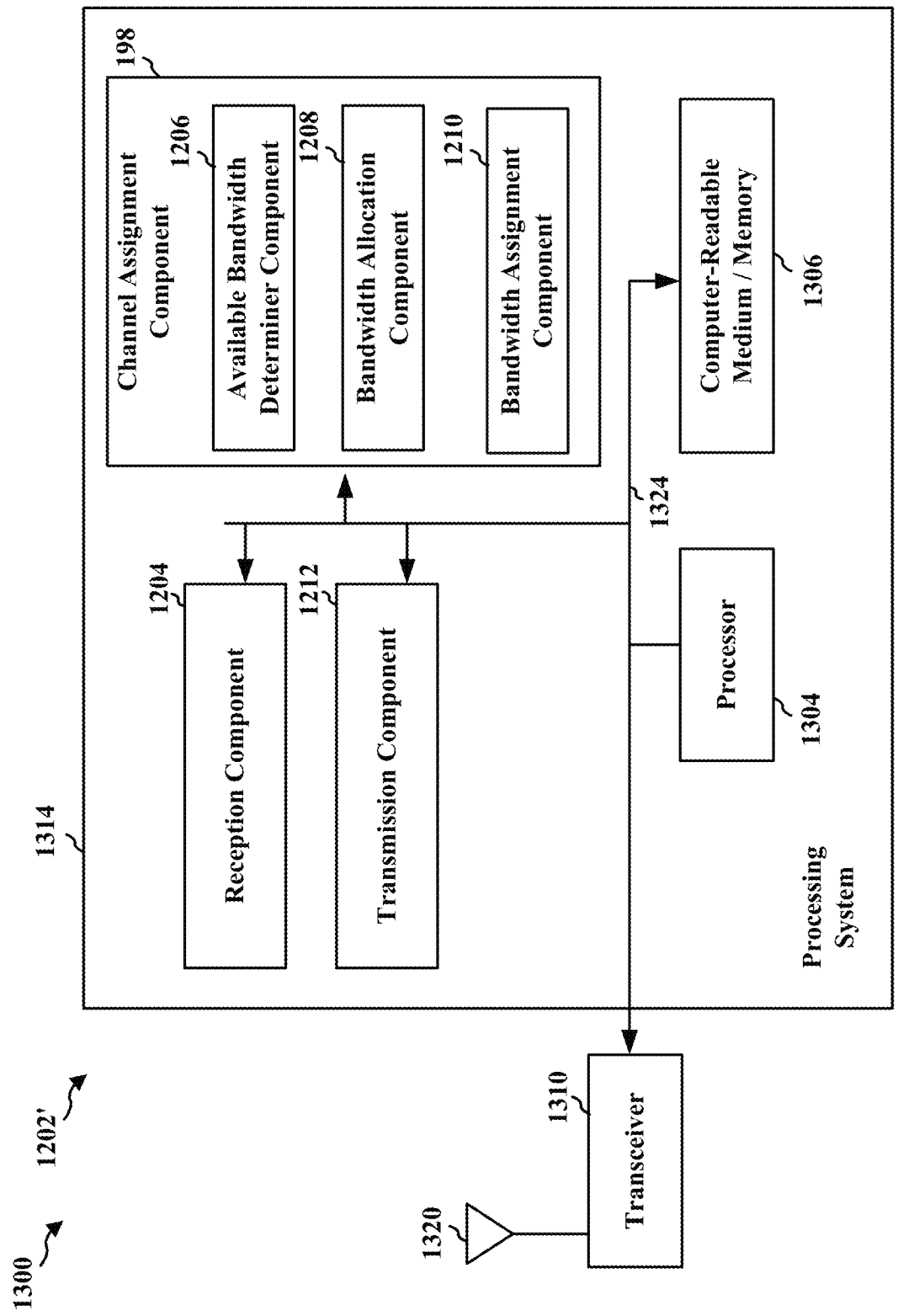
FIG. 13 is a diagram illustrating an example of a hardware implementation for an apparatus employing a processing system according to one or more described aspects.

FIG. 13 is a diagram 1300 illustrating an example of a hardware implementation for an apparatus 1202' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware components, represented by the processor 1304, the components 198, 1204, 1206, 1208, 1210, and 1212 and the computer-readable medium/memory 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The transceiver 1310 receives a signal from the one or more antennas 1320, extracts information from the received signal, and provides the extracted information to the processing system 1314, specifically the reception component 1204. In addition, the transceiver 1310 receives information from the processing system 1314, specifically the transmission component 1212, and based on the received information, generates a signal to be applied to the one or more antennas 1320. The processing system 1314 includes a processor 1304 coupled to a computer-readable medium/memory 1306. The processor 1304 is responsible for general processing, including the execution of software stored on the computer-readable medium/memory 1306. The software, when executed by the processor 1304, causes the processing system 1314 to perform the various functions described supra for any particular apparatus. The computer-readable medium/memory 1306 may also be used for storing data that is manipulated by the processor 1304 when executing software. The processing system 1314 further includes at least one of the components 198, 1204, 1206, 1208, 1210, and 1212. The components may be software components running in the processor 1304, resident/stored in the computer readable medium/memory 1306, one or more hardware components coupled to the processor 1304, or some combination thereof. The processing system 1314 may be a component of SAS entity 402, co-existence manager component 416, and/or eNB 310 and may include the memory 376 and/or at least one of the TX processor 316, the RX processor 370, and the controller/processor 375.

In one configuration, the apparatus 1202/1202' for wireless communication includes means for determining an amount of available bandwidth within a radio frequency band for shared access by a plurality of operators, where each operator operates a radio access network having one of a plurality of radio communication compatibility types, where each radio communication compatibility type defines a set of one or more compatible radio access technologies, means for allocating the amount of available bandwidth into radio compatibility type-specific bandwidth partitions for each radio communication compatibility type based on a number of the plurality of radio communication compatibility types and a number of the plurality of operators corresponding to each radio communication compatibility type, and means for assigning a primary channel bandwidth to each operator within each radio compatibility type-specific bandwidth partition.

The aforementioned means may be one or more of the aforementioned components of the apparatus 1202 and/or the processing system 1314 of the apparatus 1202' configured to perform the functions recited by the aforementioned means. As described supra, the processing system 1314 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication, comprising:
determining an amount of available bandwidth within a radio frequency band for shared access by a plurality of operators, wherein each operator operates a radio access network having one of a plurality of radio communication compatibility types, wherein each radio communication compatibility type defines a set of one or more compatible radio access technologies, and wherein determining the amount of available bandwidth further comprises reducing the amount of available bandwidth by an amount of bandwidth corresponding to one or more guard bandwidth frequency ranges from the radio frequency band, and wherein the one or more guard bandwidth frequency ranges corresponds to at least one guard bandwidth to be allocated between at least a portion of radio compatibility type-specific bandwidth partitions;

allocating, based on a first number and a second number, the amount of available bandwidth into the radio compatibility type-specific bandwidth partitions for each radio communication compatibility type, wherein the first number is determined as a number of the plurality of radio communication compatibility types and the second number is determined as a number of the plurality of operators corresponding to each radio communication compatibility type; and assigning a primary channel within at least one of the radio compatibility type-specific bandwidth partitions to at least one operator of the number of the plurality of operators.

2. The method of claim 1, wherein determining the amount of available bandwidth further comprises subtracting one or more reserved frequency ranges from the radio frequency band, wherein the one or more reserved frequency ranges corresponds to bandwidth reserved for incumbent licenses and priority access licenses.

3. The method of claim 1, wherein the one or more guard bandwidth frequency ranges further corresponds to guard bandwidth between the available bandwidth and one or more reserved frequency ranges.

4. The method of claim 1, wherein allocating the amount of available bandwidth into radio compatibility type-specific bandwidth partitions further comprises:
proportioning frequencies within the at least one of the radio compatibility type-specific bandwidth partitions according to the number of the plurality of operators corresponding to each radio communication compatibility type.

5. The method of claim 1, wherein allocating the amount of available bandwidth into radio compatibility type-specific bandwidth partitions further comprises:
proportioning frequencies within the at least one of the radio compatibility type-specific bandwidth partitions according to a number of Citizens Broadband Radio Service devices (CBSD) that belong to each radio communication compatibility type.

6. The method of claim 1,
wherein assigning the primary channel to the at least one operator:
dividing the at least one of the radio compatibility type-specific bandwidth partitions by the number of the plurality of operators corresponding to a respective radio communication compatibility type of the at least one of the radio compatibility type-specific bandwidth partitions to define one or more operator-specific bandwidths; and wherein the assigning includes assigning the primary channel to one of the one or more operator-specific bandwidths.

7. The method of claim 1, wherein the one or more guard bandwidth frequency ranges further corresponds to guard bandwidth between the available bandwidth and one or more reserved frequency ranges;

wherein assigning the primary channel to the at least one operator further comprises:

identifying at least one non-contention-based access type within the plurality of radio communication compatibility types; and for the at least one non-contention-based access type:

dividing the at least one of the radio compatibility type-specific bandwidth partitions by the number of the plurality of operators corresponding to a respective radio communication compatibility type of the at least one of the radio compatibility type-specific bandwidth partitions to define one or more operator-specific bandwidths; and wherein the assigning includes assigning each primary channel for each operator of the at least one non-contention-based access type to one of the one or more operator-specific bandwidths.

8. The method of claim 1, wherein determining the amount of available bandwidth further comprises subtracting one or more inter-partition guard bandwidth frequency ranges from the at least one of the radio compatibility type-specific bandwidth partitions; and wherein assigning the primary channel to the at least one operator further comprises:

dividing the at least one of the radio compatibility type-specific bandwidth partitions from which the one or more inter-partition guard bandwidth frequency ranges were subtracted by the number of the plurality of operators corresponding to the respective radio communication compatibility type to define one or more operator-specific bandwidths; and wherein the assigning includes assigning each primary channel for each operator of the number of the plurality of operators from the at least one of the radio compatibility type-specific bandwidth partitions from which the one or more inter-partition guard bandwidth frequency ranges were subtracted to one of the one or more operator-specific bandwidths.

9. The method of claim 1, wherein the assigning includes assigning a same frequency range within the at least one of the radio compatibility type-specific bandwidth partitions to two or more operators having non-interfering coverage areas.

10. The method of claim 1, wherein the assigning includes assigning a same frequency range within the at least one of the radio compatibility type-specific bandwidth partitions to two or more Citizens Broadband Radio Service devices (CBSD) having non-interfering coverage areas.

11. The method of claim 1, wherein the assigning includes assigning a same frequency range within the at least one of the radio compatibility type-specific bandwidth partitions to two or more technologies having non-interfering coverage areas.

12. The method of claim 1, wherein the assigning includes independently performing the assigning, within the at least one of the radio compatibility type-specific bandwidth partitions, for each of two or more sets of operators having non-interfering coverage areas.

13. The method of claim 1, wherein the assigning includes assigning a same frequency range within the at least one of the radio compatibility type-specific bandwidth partitions to two or more operators having a least amount of interfering coverage areas.

14. The method of claim 1, wherein the determining, the allocating, and the assigning are performed by a central entity including a spectrum access system (SAS) entity or a co-existence manager (CXM) component.

15. An apparatus for wireless communications, comprising:

a transceiver for communicating one or more wireless signals via one or more antennas;

a memory configured to store instructions; and one or more processors communicatively coupled with the transceiver and the memory, wherein the instructions are executable by the one or more processors to cause the apparatus to:

determine an amount of available bandwidth within a radio frequency band for shared access by a plurality of operators, wherein each operator operates a radio access network having one of a plurality of radio communication compatibility types, wherein each radio communication compatibility type defines a set of one or more compatible radio access technologies, and wherein the one or more processors are configured to determine the amount of available bandwidth at least in part by reducing the amount of available bandwidth by an amount of bandwidth corresponding to one or more guard bandwidth frequency ranges from the radio frequency band, and wherein the one or more guard bandwidth frequency ranges corresponds to at least one guard bandwidth to be allocated between at least a portion of radio compatibility type-specific bandwidth partitions;

allocate, based on a first number and a second number, the amount of available bandwidth into the radio compatibility type-specific bandwidth partitions for each radio communication compatibility type, wherein the first number is determined as a number of the plurality of radio communication compatibility types and the second number is determined as a number of the plurality of operators corresponding to each radio communication compatibility type; and assign a primary channel within at least one of the radio compatibility type-specific bandwidth partitions to at least one operator of the number of the plurality of operators.

16. The apparatus of claim 15, wherein the instructions are further executable by the one or more processors to cause the apparatus to determine the amount of available bandwidth at least in part by subtracting one or more reserved frequency ranges from the radio frequency band, wherein the one or more reserved frequency ranges corresponds to bandwidth reserved for incumbent licenses and priority access licenses.

17. The apparatus of claim 15, wherein the one or more guard bandwidth frequency ranges further corresponds to guard bandwidth between the available bandwidth and one or more reserved frequency ranges.

18. The apparatus of claim 15, wherein the instructions are further executable by the one or more processors to cause the apparatus to allocate the amount of available bandwidth into radio compatibility type-specific bandwidth partitions at least in part by:

proportioning frequencies within the at least one of the radio compatibility type-specific bandwidth partitions according to the number of the plurality of operators corresponding to each radio communication compatibility type.

19. The apparatus of claim 15, wherein the instructions are further executable by the one or more processors to cause the apparatus to allocate the amount of available bandwidth into radio compatibility type-specific bandwidth partitions at least in part by:

proportioning frequencies within the at least one of the radio compatibility type-specific bandwidth partitions according to a number of Citizens Broadband Radio Service devices (CBSD) that belong to each radio communication compatibility type.

20. The apparatus of claim 15, wherein instructions are further executable by the one or more processors to cause the apparatus to assign the primary channel to the at least one operator at least in part by:

dividing the at least one of the radio compatibility type-specific bandwidth partitions by the number of the plurality of operators corresponding to a respective radio communication compatibility type of the at least one of the radio compatibility type-specific bandwidth partitions to define one or more operator-specific bandwidths; and wherein the instructions are further executable by the one or more processors to cause the apparatus to assign the primary channel to one of the one or more operator-specific bandwidths.

21. The apparatus of claim 15, wherein the one or more guard bandwidth frequency ranges further corresponds to guard bandwidth between the available bandwidth and one or more reserved frequency ranges;

wherein the instructions are further executable by the one or more processors to cause the apparatus to assign the primary channel to the at least one operator at least in part by:

identifying at least one non-contention-based access type within the plurality of radio communication compatibility types; and for the at least one non-contention-based access type:

dividing the at least one of the radio compatibility type-specific bandwidth partitions by the number of the plurality of operators corresponding to a respective radio communication compatibility type of the at least one of the radio compatibility type-specific bandwidth partitions to define one or more operator-specific bandwidths; and wherein the instructions are further executable by the one or more processors to cause the apparatus to assign each primary channel for each operator of the at least one non-contention-based access type to one of the one or more operator-specific bandwidths.

22. The apparatus of claim 15, wherein the instructions are further executable by the one or more processors to cause the apparatus to determine the amount of available bandwidth at least in part by subtracting one or more inter-partition guard bandwidth frequency ranges from the at least one of the radio compatibility type-specific bandwidth partitions; and wherein the instructions are further executable by the one or more processors to cause the apparatus to assign the primary channel to the at least one operator at least in part by:

dividing the at least one of the radio compatibility type-specific bandwidth partitions from which the one or more inter-partition guard bandwidth frequency ranges were subtracted by the number of the plurality of operators corresponding to the respective radio communication compatibility type to define one or more operator-specific bandwidths; and wherein the instructions are further executable by the one or more processors to cause the apparatus to assign each primary channel for each operator of the number of the plurality of operators from the at least one of the radio compatibility type-specific bandwidth partitions from which the one or more inter-partition guard bandwidth frequency ranges were subtracted to one of the one or more operator-specific bandwidths.

23. The apparatus of claim 15, wherein the instructions are further executable by the one or more processors to cause the apparatus to assign a same frequency range within the at least one of the radio compatibility type-specific bandwidth partitions to two or more operators having non-interfering coverage areas.

24. The apparatus of claim 15, wherein the instructions are further executable by the one or more processors to cause the apparatus to assign a same frequency range within the at least one of the radio compatibility type-specific bandwidth partitions to two or more Citizens Broadband Radio Service devices (CBSD) having non-interfering coverage areas.

25. The apparatus of claim 15, wherein the instructions are further executable by the one or more processors to cause the apparatus to assign a same frequency range within the at least one of the radio compatibility type-specific bandwidth partitions to two or more technologies having non-interfering coverage areas.

26. The apparatus of claim 15, wherein the instructions are further executable by the one or more processors to cause the apparatus to independently perform assigning, within the at least one of the radio compatibility type-specific bandwidth partitions, for each of two or more sets of operators having non-interfering coverage areas.

27. The apparatus of claim 15, wherein the instructions are further executable by the one or more processors to cause the apparatus to assign a same frequency range within the at least one of the radio compatibility type-specific bandwidth partitions to two or more operators having a least amount of interfering coverage areas.

28. The apparatus of claim 15, wherein the apparatus is one of a central entity including a spectrum access system (SAS) entity or a co-existence manager (CCM) component.

29. An apparatus of wireless communication, comprising:

means for determining an amount of available bandwidth within a radio frequency band for shared access by a plurality of operators, wherein each operator operates a radio access network having one of a plurality of radio communication compatibility types, wherein each radio communication compatibility type defines a set of one or more compatible radio access technologies, and wherein the means for determining determines the amount of available bandwidth at least in part by reducing the amount of available bandwidth by an amount of bandwidth corresponding to one or more guard bandwidth frequency ranges from the radio frequency band, and wherein the one or more guard bandwidth frequency ranges corresponds to at least one guard bandwidth to be allocated between at least a portion of radio compatibility type-specific bandwidth partitions;

means for allocating, based on a first number and a second number, the amount of available bandwidth into the radio compatibility type-specific bandwidth partitions for each radio communication compatibility type, wherein the first number is determined as a number of the plurality of radio communication compatibility types and the second number is determined as a number of the plurality of operators corresponding to each radio communication compatibility type; and means for assigning a primary channel within at least one of the radio compatibility type-specific bandwidth partitions to at least one operator of the number of the plurality of operators.

30. A non-transitory computer-readable medium storing code executable by one or more processors for wireless communications, wherein the code comprises:

code for determining an amount of available bandwidth within a radio frequency band for shared access by a plurality of operators, wherein each operator operates a radio access network having one of a plurality of radio communication compatibility types, wherein each radio communication compatibility type defines a set of one or more compatible radio access technologies, and wherein the code for determining determines the amount of available bandwidth at least in part by reducing the amount of available bandwidth by an amount of bandwidth corresponding to one or more guard bandwidth frequency ranges from the radio frequency band, and wherein the one or more guard bandwidth frequency ranges corresponds to at least one guard bandwidth to be allocated between at least a portion of radio compatibility type-specific bandwidth partitions;

code for allocating, based on a first number and a second number, the amount of available bandwidth into the radio compatibility type-specific bandwidth partitions for each radio communication compatibility type, wherein the first number is determined as a number of the plurality of radio communication compatibility types and the second number is determined as a number of the plurality of operators corresponding to each radio communication compatibility type; and code for assigning a primary channel within at least one of the radio compatibility type-specific bandwidth partitions to at least one operator of the number of the plurality of operators.

* * * * *